Dec. 21, 1937.   J. C. WALTER   2,103,128
REFUSE COLLECTING VEHICLE
Filed June 14, 1937   3 Sheets-Sheet 1
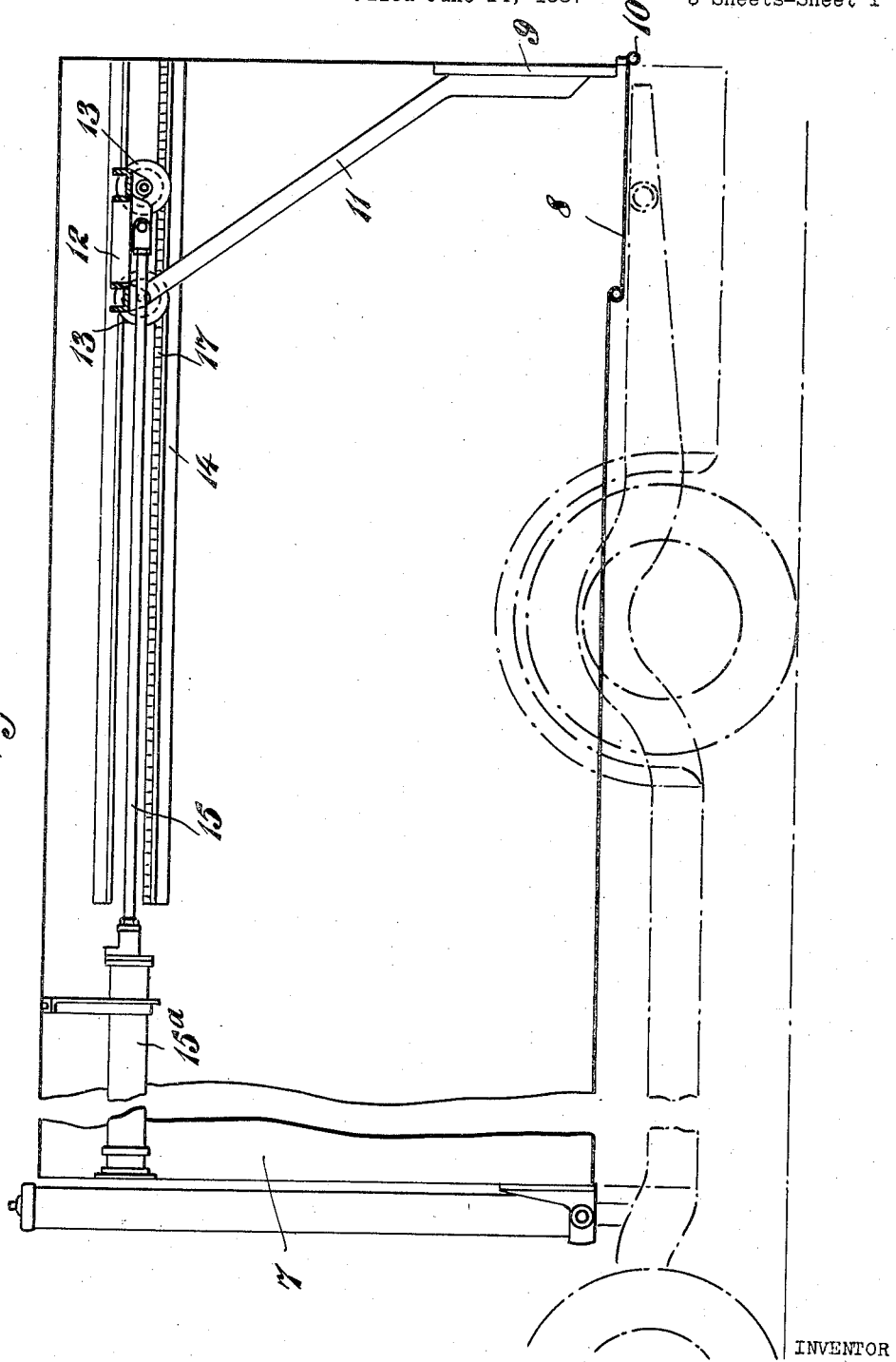
INVENTOR
James Constant Walter.
By Norris & Bateman
ATTORNEYS Dec. 21, 1937.                J. C. WALTER                 2,103,128
                       REFUSE COLLECTING VEHICLE
                        Filed June 14, 1937        3 Sheets-Sheet 2
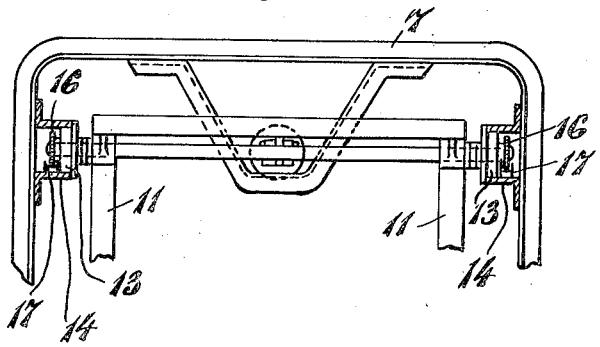
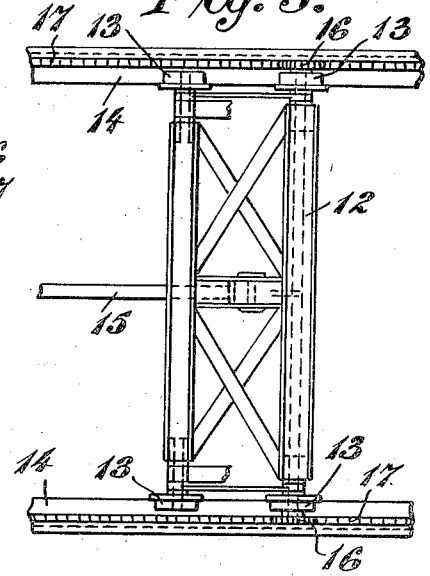
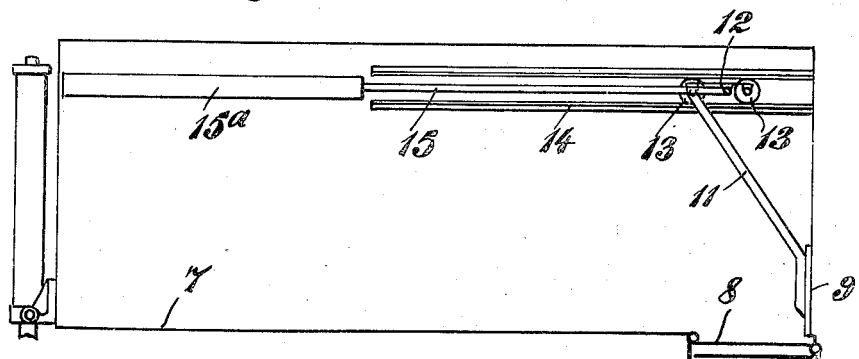
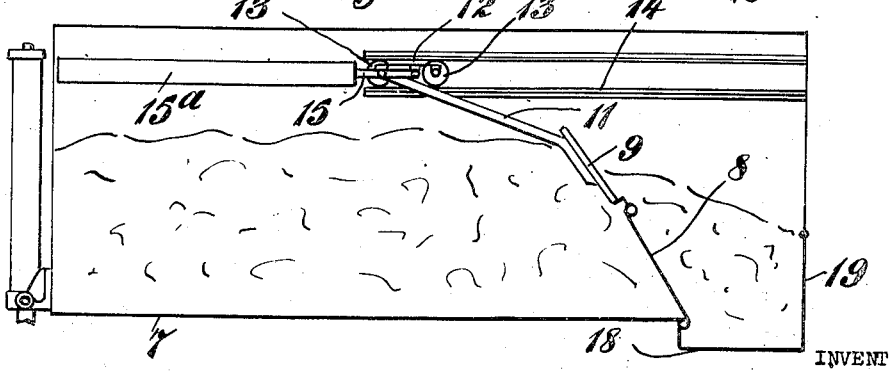
INVENTOR
James Constant Walter.
By Norris & Bateman
ATTORNEYS Dec. 21, 1937.   J. C. WALTER   2,103,128
REFUSE COLLECTING VEHICLE
Filed June 14, 1937   3 Sheets-Sheet 3
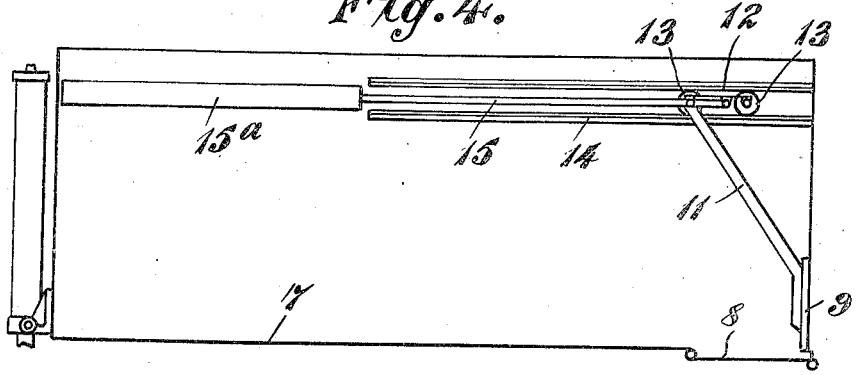
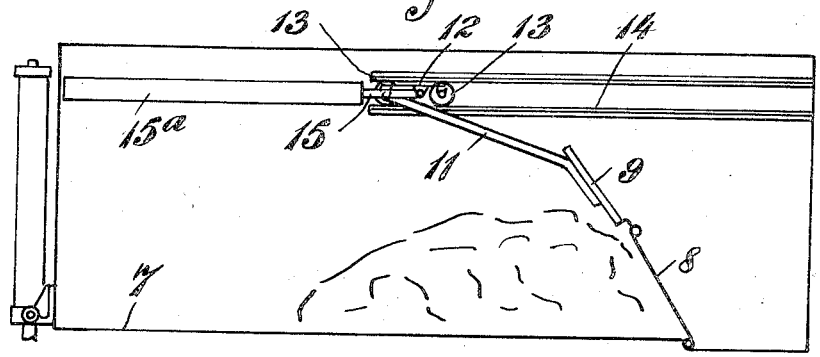
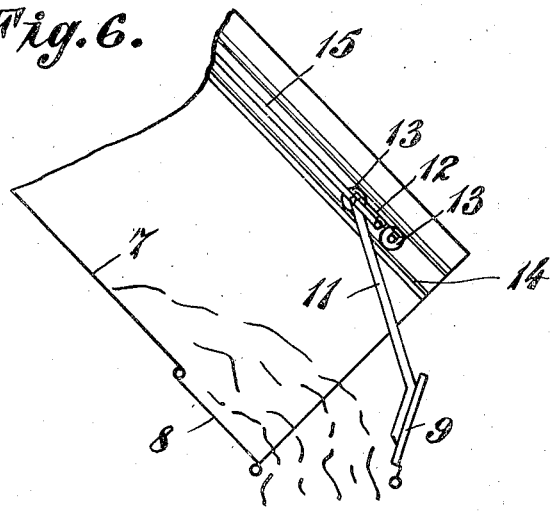
INVENTOR
James Constant Walter.
By Norris & Bateman
ATTORNEYS Patented Dec. 21, 1937

2,103,128

UNITED STATES PATENT OFFICE 2,103,128

REFUSE COLLECTING VEHICLE

James Constant Walter, Warwick, England, assignor to The Eagle Engineering Company, Limited, Eagle Works, Warwick, England Application June 14, 1937, Serial No. 148,175
In Great Britain May 7, 1936

7 Claims. (Cl. 214—67)

This invention has reference to improvements in refuse collecting vehicles and has for its object the provision of an improved refuse collecting vehicle of the kind wherein loading can be effected from the end of the vehicle and in which improved means is provided for progressively feeding the material forward into the body so as to enable the maximum amount of refuse to be loaded into the vehicle consonant with the capacity of the body.

The invention consists of an improved refuse collecting vehicle wherein the body has hinged to the rear end thereof adjacent to the floor the loading section of a combined loading and a closure means which has connection with means, preferably power operated, by which the loading and closure section of the said closure means can be turned and thereby caused to move material loaded on to the loading section into the body and to progress material already deposited on the load towards the forward end of the body.

The invention further consists in an improved refuse collecting vehicle wherein the body of the vehicle has hinged to the rear end thereof adjacent to the floor the loading section of a combined loading and closure means which is connected to a member which is traversable longitudinally of the body of the vehicle the longitudinal traverse of the said member enabling the loading and closure sections of the closure means to be turned and moved so as to feed material deposited over the closure section of the closure means on to the loading section thereof into the body of the vehicle and to progress material already deposited in the body towards the forepart of the vehicle as required.

The invention still further resides in the details of construction of the improved refuse collecting vehicle to be described hereinafter.

A convenient embodiment of the invention will now be described with particular reference to the accompanying sheets of drawings which illustrate the invention in its application to a motor driven refuse collecting vehicle having an "end" tipping body of known construction.

In the drawings:—

Figure 1 is a part sectional side elevation of sufficient of the improved refuse collecting vehicle as is necessary to an understanding of the invention.

Figure 2 is a view, partly in elevation and partly in section, of the upper portion of the rear end of the vehicle illustrated in Figure 1.

Figure 3 is a fragmentary view in plan illustrating the longitudinally traversable member for turning the closure means about its hinge.

Figure 4 is a diagrammatic view showing the body of the improved vehicle in the normal loading position.

Figure 5 is a similar view to Figure 4 but showing the manner of feeding material into the forepart of the body of the vehicle.

Figure 6 is a fragmentary view illustrating the manner of unloading the body of the vehicle.

Figure 7 is a diagrammatic view showing the body of a modified construction with the parts in the normal loading position, and Figure 8 is a similar view to Figure 7 but illustrating the parts in the position occupied when carrying an emergency load.

In the drawings like numerals of reference indicate similar parts in the several views.

According to the embodiment of the invention illustrated in Figures 1 to 6 the bottom of the rear end of the body 7 has hinged thereto a door comprising a pair of panels 8, 9 which are hingedly connected together along their line of junction by a removable hinge pin 10, the hinging of the said panels 8 and 9 enabling the panel 8 to occupy a substantially horizontal position and the other panel 9 to occupy a substantially vertical position when the door is in the loading position see Figures 1 and 4. At each end the vertical panel 9 has connection with the lower ends of bars 11 the upper ends of which are pivotally connected to a trolley 12 carried by wheels 13 mounted in longitudinally arranged tracks 14 carried at each side of the body in the upper part thereof. The trolley 12 is connected to the free end of a hydraulic ram 15 the cylinder 15ᵃ wherefor is arranged longitudinally along the centre-line of the body 7 of the vehicle.

The front axle of the trolley 12 is also provided at each end with a sprocket wheel 16 which engage with chains 17 arranged longitudinally and disposed adjacent to the tracks 14 on which run the wheels 13 of the trolley 12 as and for a purpose to be described hereinafter.

The improved refuse collecting vehicle is utilized in the following manner.

For loading the trolley 12 is located at the rear end of its travel in which case the panel 8 of the door is arranged horizontally and the panel 9 vertically, see Figures 1 and 4. The refuse is then tipped over the upper edge of the vertical panel 9 on to the surface of the horizontal panel 8 of the door. When further space is required for rubbish the hydraulic ram 15 is actuated to draw the trolley 12 forwardly whereby the panel 9 of the door is drawn upwardly and the two panels 8 and 9 caused to turn about their common hinge pin 10 as well as about the hinge connecting the panel 8 to the body 7. This movement results in the door panels 8 and 9 forcing the refuse deposited on the lower panel forwardly into the body 7 of the vehicle, see Figure 5. The door is then returned to the loading position and loading continued as before.

For emptying purposes the hinge pin 10 connecting the panel 9 to the panel 8 is removed so that on "end" tipping the body the panels swing clear and enable the contents to be discharged in the ordinary manner, see Figure 6.

It should be understood that the engagement of the sprocket wheels 16 on the trolley 12 with the chains 17 acts in the manner of a rack and pinion and ensures a true guided longitudinal movement of the trolley 12 which obviates binding of the wheels 13 of the trolley on the tracks 14 and twisting of the tail door panels 8, 9 due to uneven loading or resistance when the door is being used to pack the refuse into the forward part of the body 7.

According to the modified construction illustrated in Figures 7 and 8 there is disposed below the loading section 8 of the combined loading and closure means a well 18 the bottom of which is slightly below the floor level of the vehicle. Disposed within this well is an auxiliary closure panel 19 of substantially the same depth as the closure panel 9 of the combined loading and closure means.

When the vehicle body is full the panels 8 and 9 constituting the combined loading and closure means are drawn towards the fore-part of the vehicle by the trolley 12 and if additional collection space is required the auxiliary closure panel 19 is then removed from the well 18 and hinged adjacent to the top edge thereof to the sides of the rear of the body thus providing an additional space within which the emergency or additional load can be collected, loading taking place over the top edge of the auxiliary closure panel 19 as though the normal closure panel were in use.

It will be appreciated that in emptying the emergency space has first to be emptied by tipping the body and allowing the auxiliary closure panel 19 to turn about its top hinge, the remainder of the load subsequently being unloaded by removal of the hinge between the loading section 8 and the floor of the vehicle. A refuse collecting vehicle constructed as hereinbefore described enables the maximum amount of refuse to be deposited in the body consonant with the capacity of the body and, furthermore, permits of loading from the end and from a low level which is very convenient from the loader's point of view.

What I claim is:—

1. A refuse collecting vehicle incorporating a body for the reception of the refuse, a combined loading and closure means comprising hingedly connected loading and closure sections, the loading section being hingedly connected to the body adjacent to the floor at the rear end thereof, and means connected to the closure section of said combined loading and closure means for turning the latter about its hinge connection to the body and swinging it over the floor and toward the front of the vehicle whereby refuse deposited on the loading section of the aforesaid combined means is moved into the body and material already deposited in the body progressed towards the forward end thereof.

2. A refuse collecting vehicle incorporating a body for the reception of the refuse, a loading section of a combined loading and closure means hinged adjacent to the floor at the rear of the body and adapted normally to occupy a horizontal position to provide a continuation of said floor, a closure section of said combined means pivotally connected to the loading section and adapted normally to occupy a vertical position, means traversable longitudinally to the body of the vehicle and having a connection with the closure section of the combined loading and closure means, and means for effecting the traverse of the said traversable means in a direction to swing the loading and closure sections of the combined loading and closure means upwardly about their hinges into positions above the floor and toward the front of the body and thereby cause material deposited over the closure section on to the loading section to be moved into the body of the vehicle and to progress material already deposited in the body towards the fore-part of the vehicle as required.

3. A refuse collecting vehicle incorporating a body for the reception of the refuse, a panel hinged at one edge on a transverse axis adjacent to the rear end of the floor of the body, which is normally located horizontally and which constitutes a loading section, a second panel which is hinged on a transverse axis to the other edge of the panel constituting the loading section, said second panel normally occupying a vertical position and serving as a closure section for the body, a member which is traversable longitudinally of the body and which is connected to the panel constituting the closure section, and means for effecting the longitudinal traverse of the aforesaid member relatively to the body to swing the panels upwardly and forwardly about their hinges so as to feed material deposited over the closure section panel on to the loading section panel to be moved into the body of the vehicle and to cause material already deposited on the loading section panel to be progressed towards the fore-part of the vehicle.

4. A refuse collecting vehicle incorporating a body for the reception of the refuse to be collected, a panel hinged adjacent to the rear end of the floor of the body and adapted to occupy normally a horizontal position, a panel hinged to the first named panel and adapted normally to occupy a vertical position, longitudinally arranged tracks in the body of the vehicle, a trolley adapted to traverse said tracks, means connecting the trolley to the vertically disposed panel and means for effecting a longitudinal traverse of the trolley relatively to said tracks and thereby enabling the panels to be turned about their hinges and moved so as to feed material deposited over the vertically disposed panel on to the horizontal panel into the body of the vehicle and to progress previously deposited refuse towards the fore-part of the vehicle as required.

5. A refuse collecting vehicle incorporating a body for the reception of the refuse to be collected, a panel hinged adjacent to the rear end of the floor of the body and adapted to occupy normally a horizontal position, a panel hinged to the first named panel and adapted normally to occupy a vertical position, longitudinally arranged tracks in the body of the vehicle, a trolley adapted to traverse said tracks, means connecting the trolley to the vertically disposed panel, means for effecting a longitudinal traverse of the trolley relatively to said tracks and thereby enabling the panels to be turned about their hinges and moved so as to feed material deposited over the vertically disposed panel on to the horizontal panel into the body of the vehicle and to progress previously deposited refuse towards the fore-part of the vehicle as required and guiding means for ensuring a true guided longitudinal movement of the trolley and for obviating binding of the wheels of the trolley or twisting of the vertical panel due to uneven loading or resistance when the refuse is being packed into the fore-part of the body.

6. A refuse collecting vehicle, according to claim 5, wherein a chain and sprocket means is provided for ensuring the true guided longitudinal movement of the trolley and to obviate binding of the wheels of the trolley or twisting of the vertical panel due to uneven loading or resistance when the refuse is being packed into the fore-part of the body.

7. A refuse collecting vehicle incorporating a body for the reception of the refuse, a loading section of a combined loading and closure means hinged to the body, a closure section of the said combined means hinged to the loading section, means for turning the loading and closure sections of the said combined means about their hinges whereby material loaded on to the loading section can be moved into the body and subsequently progressed towards the forward end of the body, an auxiliary load supporting surface disposed below the aforesaid loading section and a displaceable auxiliary closing means which can be hinged to the rear of the body when required to provide in conjunction with the aforesaid auxiliary loading surface additional collection space at the rear of the said combined loading and closure means when the said combined means is in the position required to be occupied when the body is normally fully closed.

JAMES CONSTANT WALTER.